(12) United States Patent
Lin et al.

(10) Patent No.: US 9,417,669 B2
(45) Date of Patent: Aug. 16, 2016

(54) SWITCH MODULE HAVING A STOP PART WHICH PREVENTS CLOSURE OF CASE COVER

(71) Applicant: Wistron Corp., New Taipei (TW)

(72) Inventors: Shih-Lung Lin, New Taipei (TW);
Ta-Wei Chen, New Taipei (TW);
Yi-Shan Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 20 days.

(21) Appl. No.: 14/597,873

(22) Filed: Jan. 15, 2015

(65) Prior Publication Data

US 2015/0262770 A1 Sep. 17, 2015

(30) Foreign Application Priority Data

Mar. 14, 2014 (TW) .............................. 103109758 A (51) Int. Cl.
*H01H 19/00* (2006.01)
*G06F 1/18* (2006.01)
*H01H 3/16* (2006.01)
*H01H 21/28* (2006.01)
*H01H 9/22* (2006.01)

(52) U.S. Cl.
CPC ............... *G06F 1/181* (2013.01); *H01H 3/161* (2013.01); *H01H 21/285* (2013.01); *H01H 9/226* (2013.01); *H01H 2003/165* (2013.01)

(58) Field of Classification Search
CPC .............. H02B 1/06; H02B 1/00; H02B 1/04; H02B 1/46; H02B 1/48
USPC .......... 200/6 R; 361/600, 610, 615, 616, 621, 361/641, 643, 644, 647, 652, 724; 312/223.1; 220/4.02
See application file for complete search history.

(56) References Cited

U.S. PATENT DOCUMENTS

| 5,410,112 | A | * | 4/1995 | Freeman | H01H 9/226 200/333 |
| 6,709,032 | B2 | * | 3/2004 | Huang | E05B 47/023 292/201 |
| 8,563,883 | B1 | * | 10/2013 | Flegel | H02B 1/48 200/50.02 |
| 9,165,731 | B2 | * | 10/2015 | Deb | H01H 71/58 |

FOREIGN PATENT DOCUMENTS

TW 201228518 A 7/2012

OTHER PUBLICATIONS

TW Office Action dated May 10, 2016 as received in Application No. 103109758 (English Translation).

* cited by examiner

*Primary Examiner* — Vanessa Girardi
(74) *Attorney, Agent, or Firm* — Maschoff Brennan (57) ABSTRACT

A case includes a housing, a cover and a switch module with a secure mechanism. The case has an accommodation portion. The cover is disposed on the case to have a cover position. The cover covers the accommodation portion. The switch module including a pressing switch and a switch-changing element is located in the accommodation portion and connected to the housing. The switch-changing includes a first pivot part, a pressing part, and a stop part. The first pivot part pivots the housing. The pressing part and the stop part jut from the first pivot part along different radial directions. The switch-changing element has a test position and a non-test position for rotating relative to the housing. When the switch-changing element locates at the test position, a position of the stop part overlaps the cover position.

16 Claims, 12 Drawing Sheets

SWITCH MODULE HAVING A STOP PART WHICH PREVENTS CLOSURE OF CASE COVER

This non-provisional application claims priority under 35 U.S.C. §119(a) on Patent Application No(s). 103109758 filed in Taiwan, R.O.C. on 2014 Mar. 14, the entire contents of which are hereby incorporated by reference.

TECHNICAL FIELD

The disclosure relates to a case, more particularly to a case having a switch module with a secure mechanism.

BACKGROUND

With the vigorous development of the cloud products, the market of high-end servers is a highly competitive market. The traditional power supply module is not able to satisfy the high-end servers which need larger power consumption and better energy efficiency. Therefore, the manufacturers always connect the power supply module with high current and high efficiency on the main board of the high-end servers to replace the traditional power supply module. However, such power supply module, being different from the traditional, has no cover for covering. This could result in electric shock and short circuit when the technicians is testing or assembling. Consequently, a secure mechanism should be designed to prevent improperly manual operations.

The disclosure provides a case having a switch module with a secure mechanism, which may avoid the accidents caused by wrong assembling steps.

SUMMARY

A case comprising a housing, a cover and a switch module with a secure mechanism is provided in the disclosure. The housing has an accommodation portion. The cover is detachably connected to the housing to have a cover position. The cover covers the accommodation portion when being in the cover position. The switch module with the secure mechanism is disposed on the housing and is located in the accommodation portion. The switch module with the secure mechanism includes a pressing switch and a switch-changing element. The switch-changing element includes a first pivot part, a pressing part and a stop part. The pressing part and the stop part jut out from the first pivot part along different radial directions. The switch-changing element is configured to rotate relative to the housing and therefore has a test position and a non-test position. When the switch-changing element is in the test position, the pressing part presses the pressing switch to make the pressing switch be in the turn-on state, and a position of the stop part overlaps the cover position to prevent the cover from being disposed on the housing. When the switch-changing element is in the non-test position, the pressing part moves out from the switch-changing element and the position of the stop part does not overlap the cover position to make the cover be capable of being disposed on the housing.

A switch module with a secure mechanism is also provided in the disclosure. The switch module with the secure mechanism is configured to be connected to a housing and be located in an accommodation portion. A cover and a lid are assembled with the housing. The cover covers the accommodation portion, and the lid covers the cover. The switch module with secure mechanism comprises a pressing switch and a switch-changing element. The switch-changing element comprises a first pivot part, a pressing part and a stop part. The first pivot part is pivoted on the housing. The pressing part and the stop part jut out from the first pivot part along different radial directions. The switch-changing element is configured to rotate relative to the housing and therefore has a test position and a non-test position. When the switch-changing element is in the test position, the pressing part presses the pressing switch to make the pressing switch be in the turn-on state and a position of the stop part overlaps the cover position to prevent the cover from being disposed on the housing. When the switch-changing element is in the non-test position, the pressing part moves out from the switch-changing element and the position of the stop part does not overlap the cover position to make the cover be capable of being disposed on the housing.

BRIEF DESCRIPTION OF THE DRAWINGS

The present disclosure will become more fully understood from the detailed description and the drawings given herein below for illustration only, and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
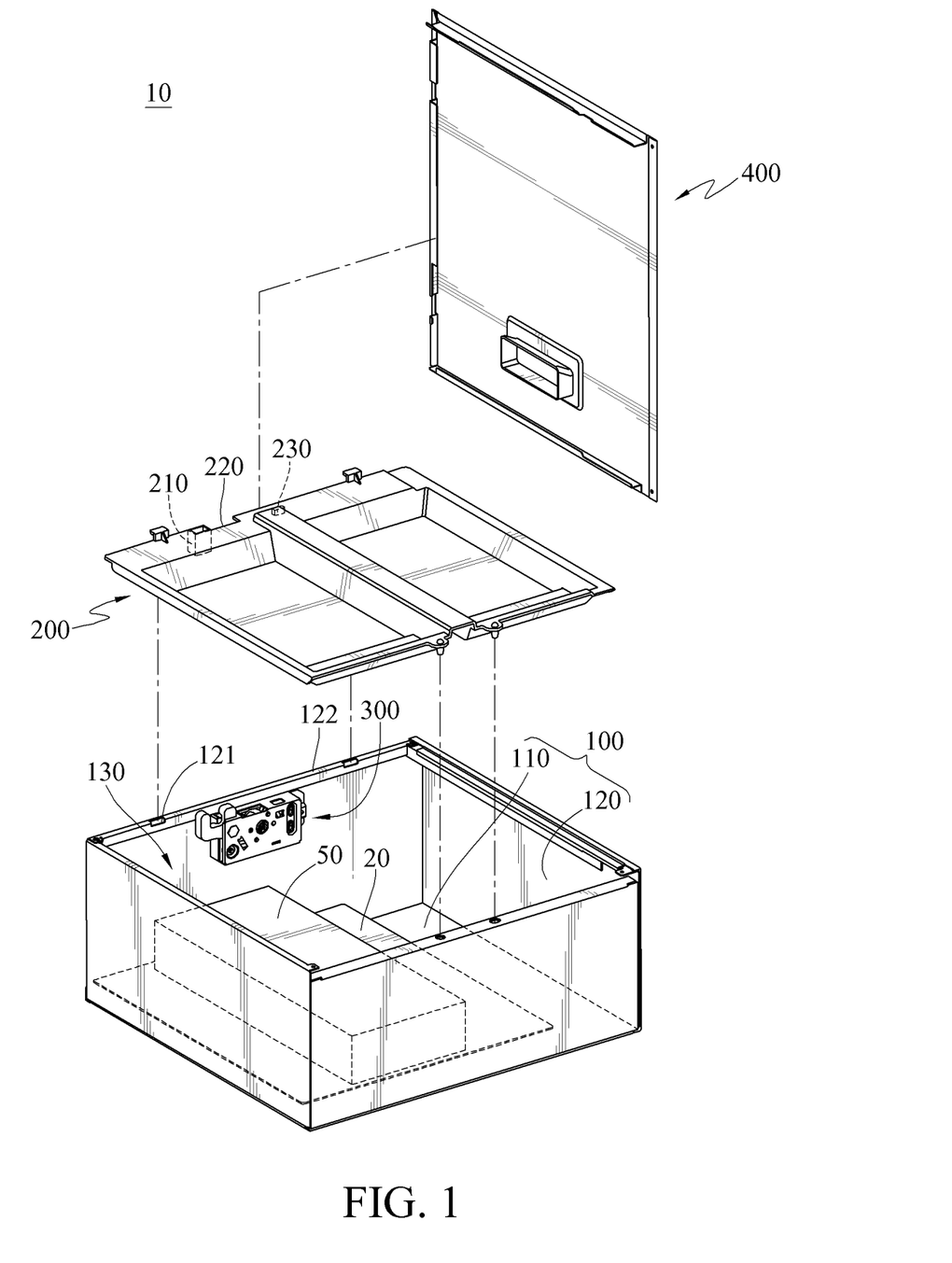
FIG. 1 is an exploded view of a case according to a first embodiment of the disclosure.
Figure 2:
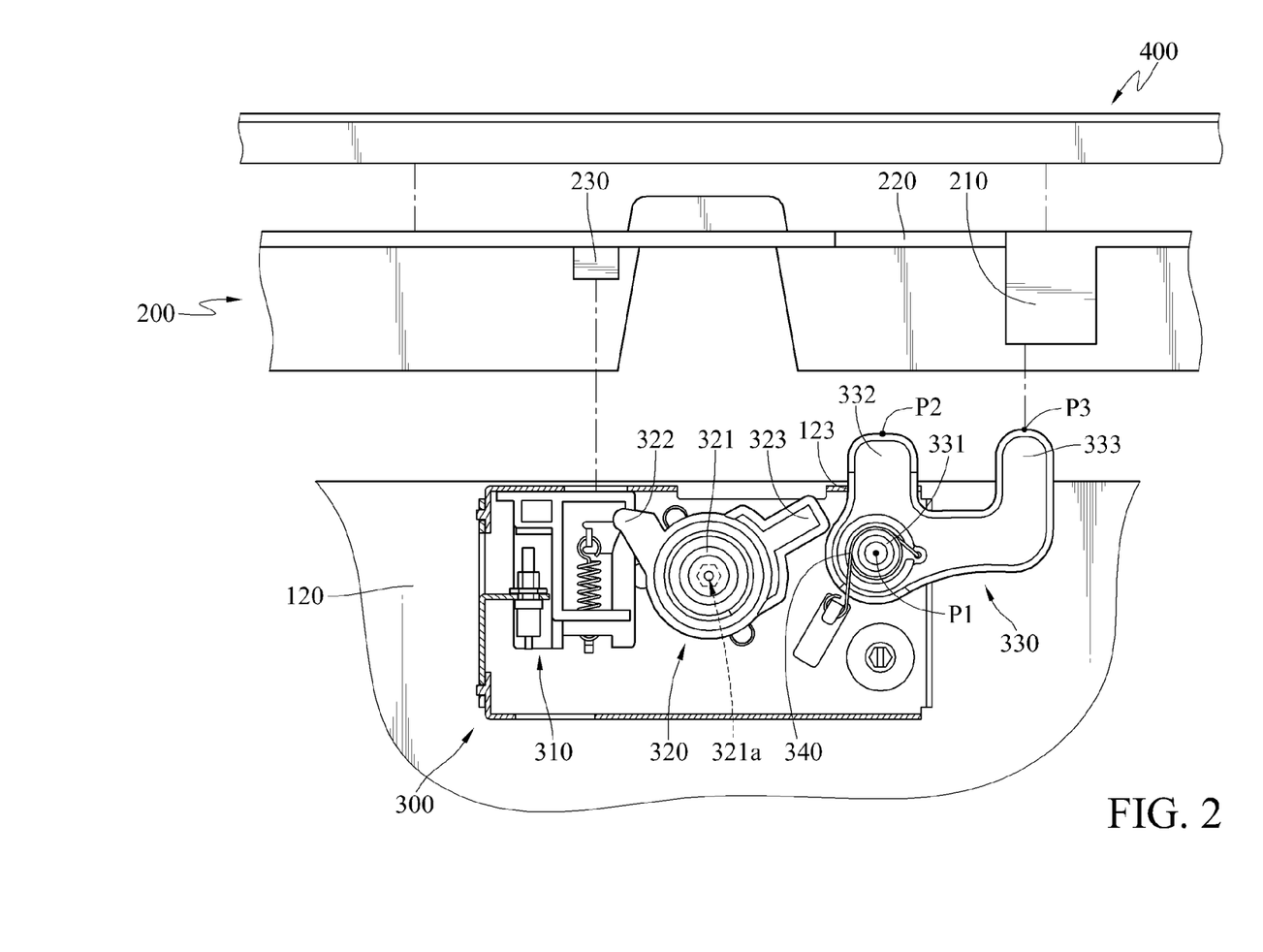
FIG. 2 is a plan view of FIG. 1.
Figure 3A:
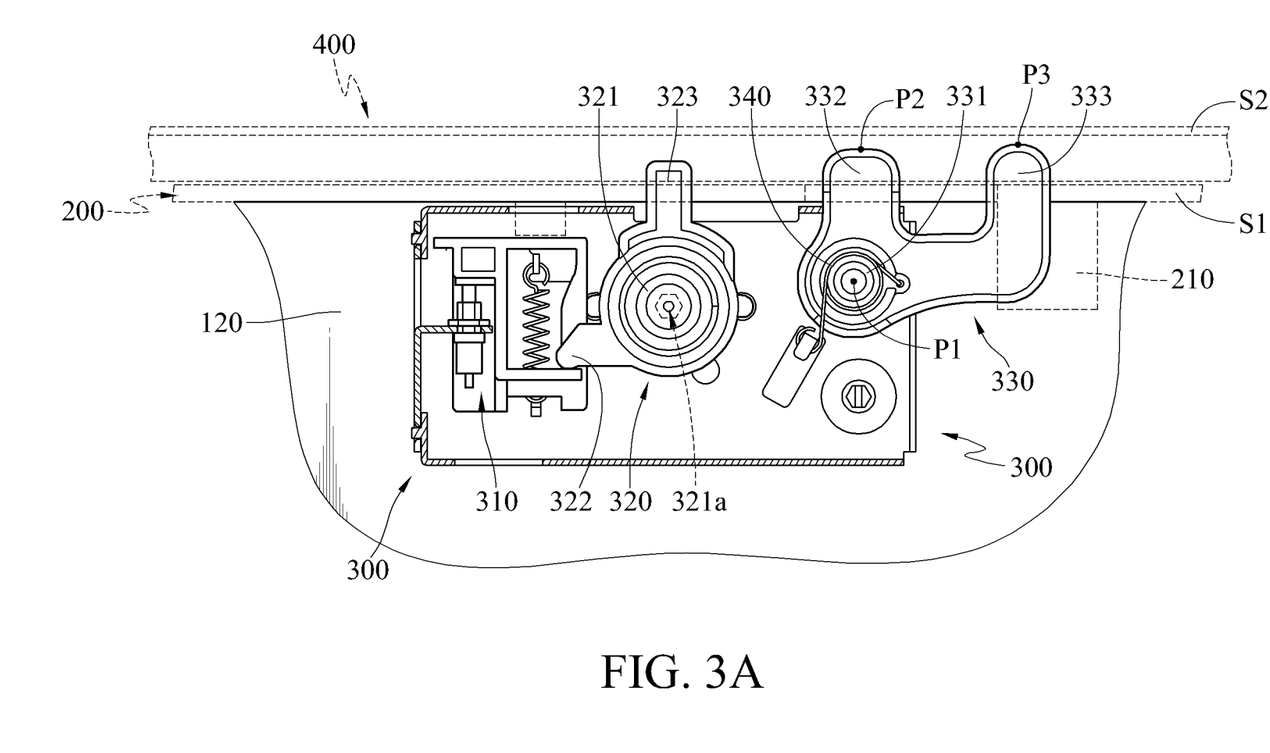
FIG. 3A is a plan view of a switch-changing element, a fool-proof element, a cover, and a lid when the switch-changing element is located at a test position and the fool-proof element is located at a starting position according to the first embodiment of the disclosure.
Figure 3B:
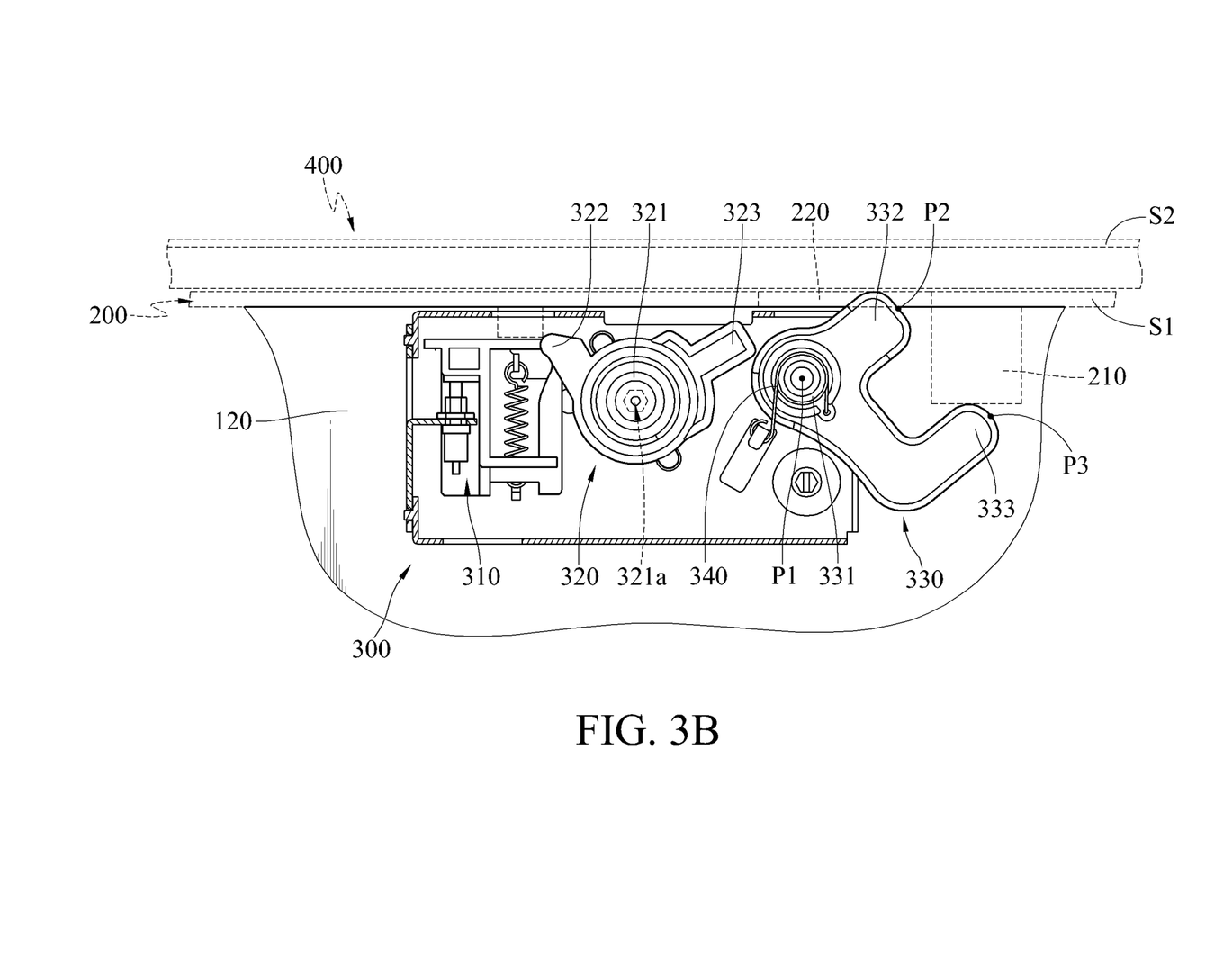
FIG. 3B is a plan view of a switch-changing element, a fool-proof element, a cover, and a lid when the switch-changing element is located at a non-test position and the fool-proof element is located at a pressed position according to the first embodiment of the disclosure.

FIG. 1 is an exploded view of a case according to a first embodiment of the disclosure, FIG. 2 is a plan view of FIG. 1, FIG. 3A is a plan view of a switch-changing element, a fool-proof element, a cover, and a lid when the switch-changing element is located at a test position and the fool-proof element is located at a starting position according to the first embodiment of the disclosure, FIG. 3B is a plan view of a switch-changing element, a fool-proof element, a cover, and a lid when the switch-changing element is located at a non-test position and the fool-proof element is located at a pressed position a case according to the first embodiment of the disclosure.

In this embodiment, a case 10 comprises a housing 100, a cover 200, a lid 400 and a switch module with a secure mechanism 300.

The case 100 comprises a bottom plate 110 and a plurality of side plates 120. The side plates 120 are connected to the bottom plate 110 to form an accommodation portion 130. The accommodation portion 130 is configured for containing a main board 20 and a power supply 30. Generally speaking, the power supply 30 has no cover and is of high current and high efficiency. Comparing with the power supply 30 with a cover, the power supply 30 without a cover is more likely to result in electric shock due to improperly manual operation. Each of the side plates 120 has a first assembly region 121 and a second assembly region 122 respectively. The distance from the first assembly region 121 to the bottom plate 110 is shorter than the distance from the second assembly region 122 to the bottom plate 110.

The cover 200, for example, is a wind shield. A groove 220 penetrates through the cover 200. The cover 200 is detachably connected to the housing 100 to have a cover position. The cover 200 contacts the first assembly region 121 and covers the accommodation portion 130 to make the accommodation portion 130 is sealed by the cover 200 and housing 100 cooperatively. In other words, the cover 200 is configured to seal the power supply 30 in the accommodation portion 130 to prevent the users from getting an electric shock when the cover 200 is in the cover position.

The cover 200 has a holding part 210, the groove 220 and a touching part 230. The holding part 210 and the groove 220 protrude from the cover 200 at the side near the bottom plate 110.

The lid 400 is detachably connected to the housing 100 to have an assembling position. The lid 400 contacts the second assembly region 122 and covers the cover 200 when locating at the assembling position.

The switch module with the secure mechanism 300 is connected to the housing 100 and located in the accommodation portion 130. The switch module with the secure mechanism 300 comprises a pressing switch 310, a switch-changing element 320, a fool-proof element 330 and an elastic element 340.

The pressing switch 310 is electrically connected to the power supply 30 in the accommodation portion 130. The pressing changes from the turn-off state to the turn-on state when being pressed. When the pressing switch 310 is in the turn-on state, the power supply 30 is conducted. When the pressing switch 310 is in the turn-off state, the power supply 30 is not conducted. When the cover 200 is in the cover position, the touching part 230 thereof presses the pressing switch 310 to make the power supply 30 conducted.

The switch-changing element 320 comprises a first pivot part 321, a pressing part 322 and a stop part 323. The first pivot part 321 is pivoted on the housing 100. The pressing part 322 and the stop part 323 jut out from the first pivot part 321 along different radial directions. The switch-changing element 320 is configured to rotate relative to the housing 100 and therefore has a test position (shown in FIG. 3A) and a non-test position (shown in FIG. 3B). When the switch-changing element 320 is in the test position, the pressing part 322 presses the pressing switch 310 so that the pressing switch 310 is in the turn-on state, thereby the power supply 30 is conducted to execute the testing of the services. Specifically, a position of the stop part 323 overlaps the cover position to prevent the cover 200 from being disposed on the housing 100 when the switch-changing element 320 is in the test position. This indicates that the stop part 323 is located in a space 51 originally occupied by the cover 200 so that the cover 200 is not assembled on the cover position carelessly when the switch-changing element 320 compulsorily makes the pressing switch 310 be in turn-on state. When the switch-changing element is in the non-test position, the pressing part 322 moves out from the switch-changing element 310 to make the switch-changing element 310 be in the turn-off state. The position of the stop part 323 does not overlaps the cover position to make the cover 200 be capable of being disposed on the housing 100. This means the stop part 323 moves out from the space 51 occupied by the cover 200 so that the cover 200 may be successfully connected to the cover position when the switch-changing element 320 is located at the non-testing position.

The stop part 323 disposed on the switch-changing element 320 is used to ensure the pressing switch 310 is driven by the cover 200 instead of the switch-changing element 320 when the cover 200 is located at the covering position. Therefore, when the cover 200 moves out from the covering position, the pressing switch 310 automatically changes from turn-on state to turn-off state, and the power supply 30 is not conducted to prevent the users from getting an electrical shock after the cover 200 is lifted.

In this embodiment, the first pivot part 321 has an adjusting structure 321a configured for letting a tool 40 to adjust the rotating location of the switch-changing element 320. The adjusting structure 321a and the tool 40, for example, is a hexagon socket and a wrench respectively.

The fool-proof element 330 comprises a second pivot part 331, a convex part 332 and a blocking part 333. The second pivot part 331 is pivoted on the housing 100. The fool-proof element 330 rotates relative to the housing around a pivot point P1 as a centerline and therefore has a starting position and a pressed position. The convex part 332 and the blocking part 333 jut from the second pivot part 331. The blocking part 333 has a blocking point P2 which is the contacting position of the blocking part 333 and the holding part 210. The convex part 332 has a stop point P3 which is the contacting position of the convex part 332 and the lid 400.

A position of the convex part 332 overlaps the assembling position to prevent the lid 400 from being disposed on the housing 100 when the fool-proof element 330 is located at the starting position. That is, the convex part 332 is located in the space S2 originally occupied by the lid 400 locating at the assembling position and juts from the second assembly region 122.

The position of the convex part 332 does not overlap the assembling position to make the lid 400 connected to the housing 100 when the fool-proof element 330 is located at the pressing position. In other words, the convex part 332 moves out from the space S2 occupied by the lid 400 locating at the assembling position, and the convex part 332 does not jut from the second assembly region 122 when the fool-proof element 330 is located at the pressing position.

Specifically, the operating principle of the fool-proof element 330 is: 1. The force applied on the fool-proof element 330 does not pass through the second pivot point 331 so that a torque is produced to pivot the fool-proof element 330 to the pressed position from the starting position when the cover 200 is connected to the housing 100. 2. The force applied on the fool-proof element 330 passes through the second pivot point 331 so that there is no torque to pivot the fool-proof element 330 when the cover 200 is not connected to the housing 100.

In detail, the fool-proof element 330 in this embodiment satisfies the conditions: the line from the pivot point to a first touching point is parallel to the assembling direction when the fool-proof element is located at the starting position, and the line from the pivot point to a second touching point encloses an acute angle with the assembling direction. However, the appearance of the fool-proof element 330 is not limited thereto as long as the design of the fool-proof element 330 satisfies the basic conditions.

Each of the side plates 120 further comprises a limiting block 123. The elastic element 340 abuts on the housing 100 and the fool-proof element 330 to make the fool-proof element 330 abut on the limiting block 123 and be located at the starting position.

In order to avoid the manufacturing error or the deformation of the cover 200 and the lid 400 inducing that the fool-proof element 330 loses the function, the fool-proof element 330 and the switch-changing element 320, in this embodiment, are located at the same side plate 120 and are as close to each other as possible.

Figure 4A:
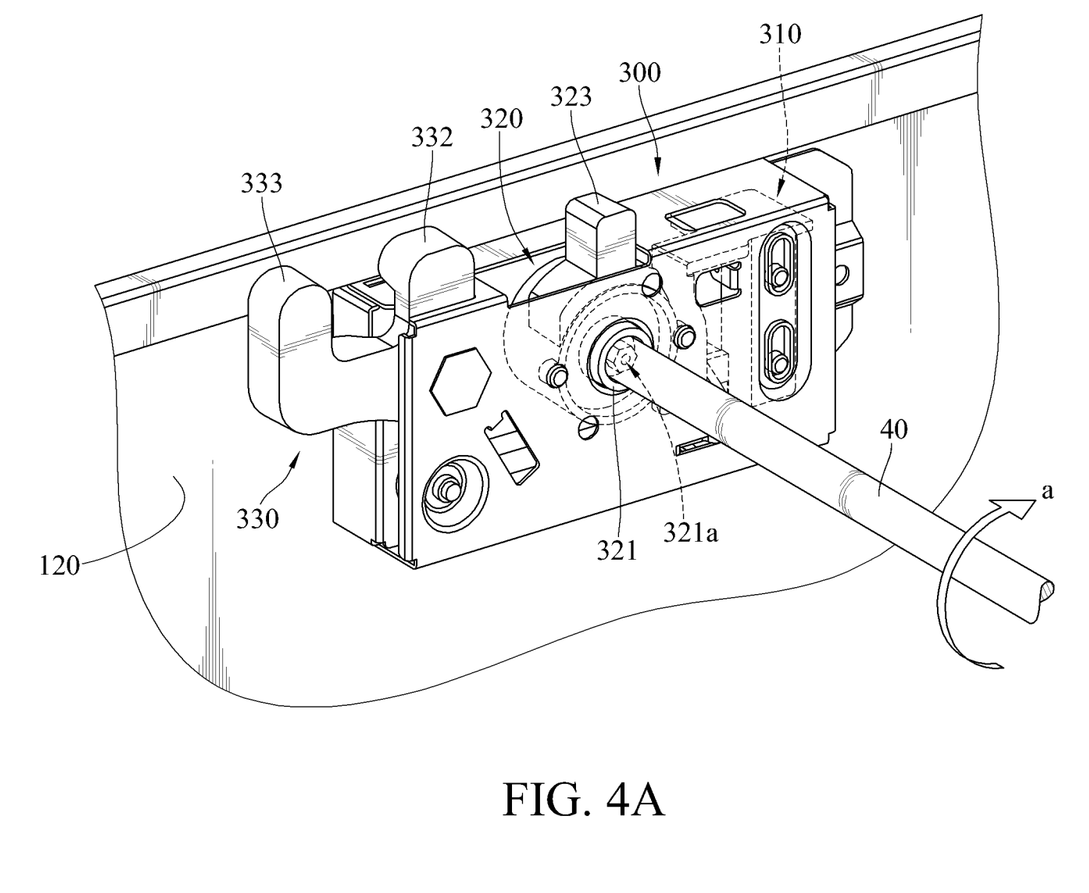
FIG. 4A is a perspective view of a switch-changing element located at the test position according to the first embodiment of the disclosure.
Figure 4B:
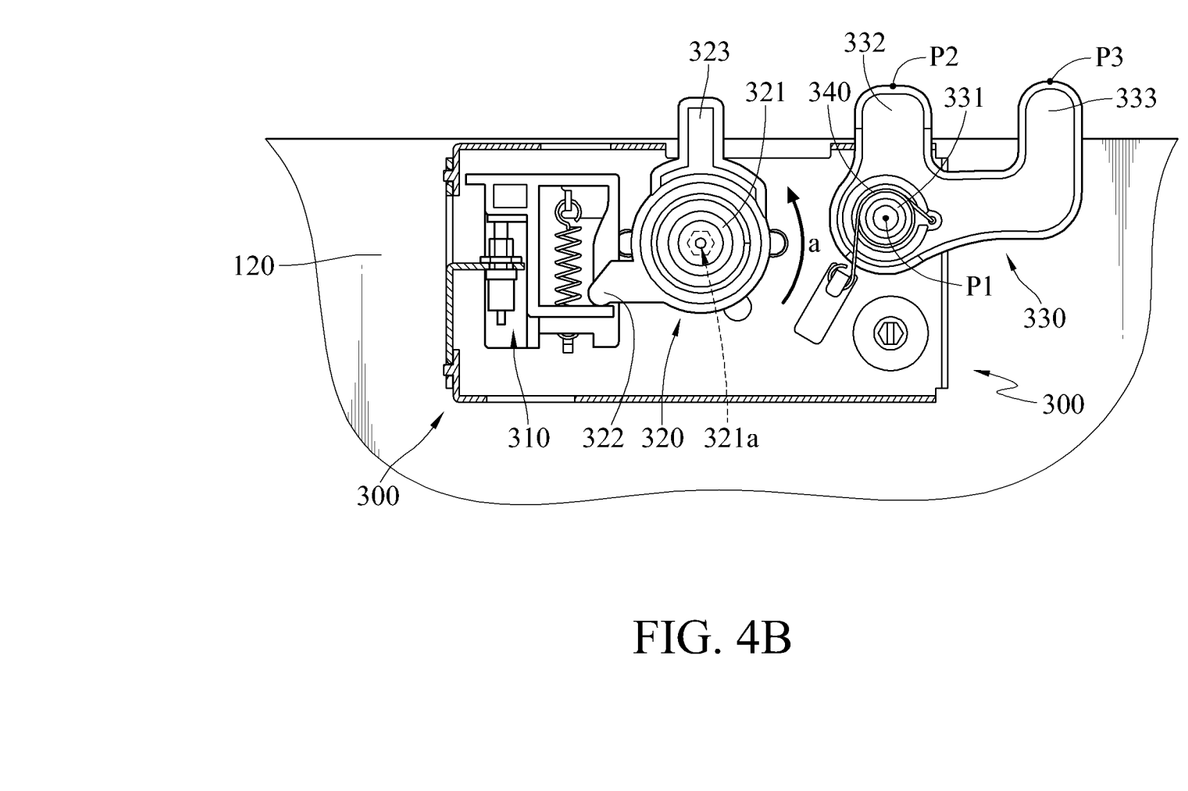
FIG. 4B is a plan view of FIG. 4A.
Figure 5A:
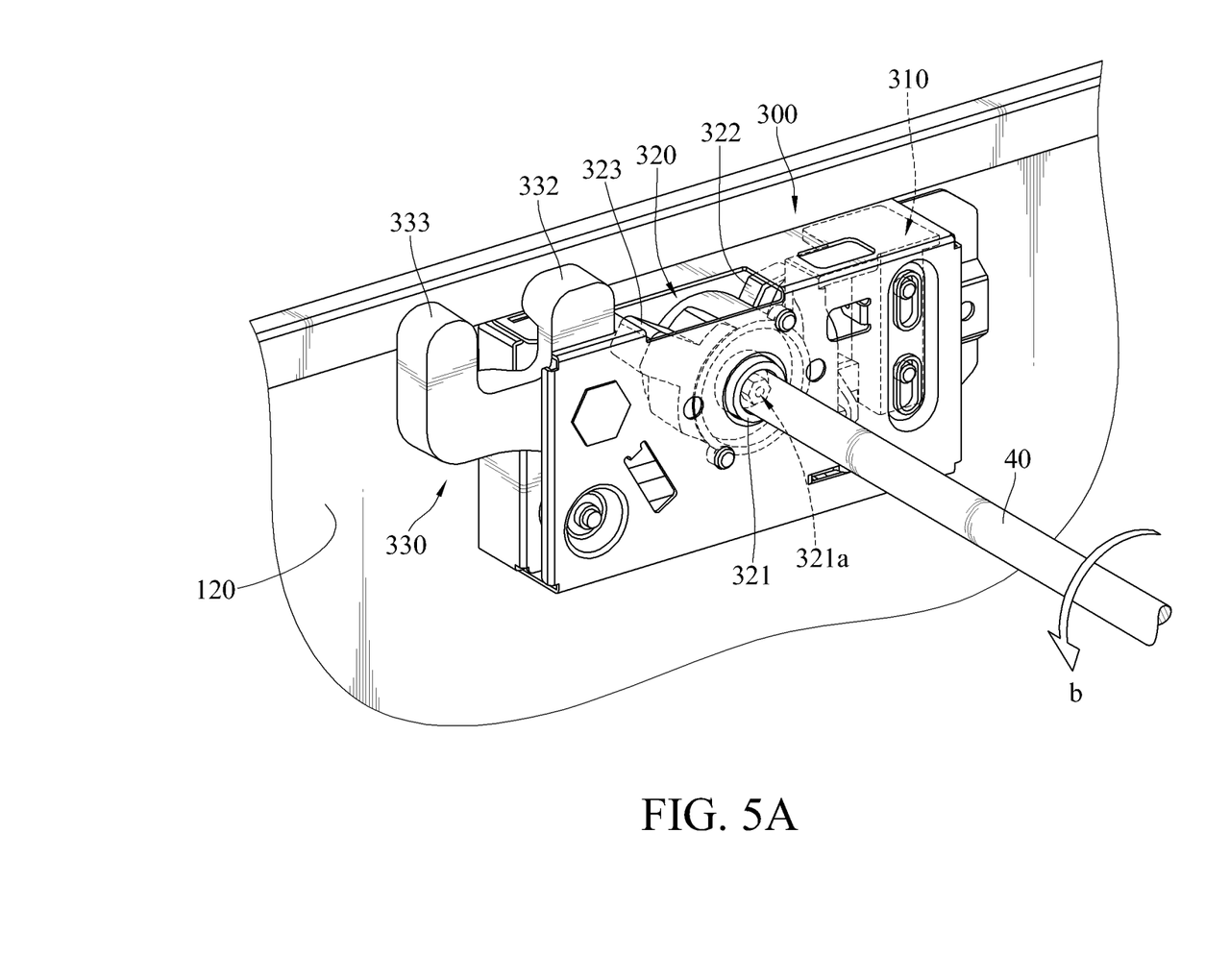
FIG. 5A is a perspective view of a switch-changing element located at the non-test position according to the first embodiment of the disclosure.
Figure 5B:
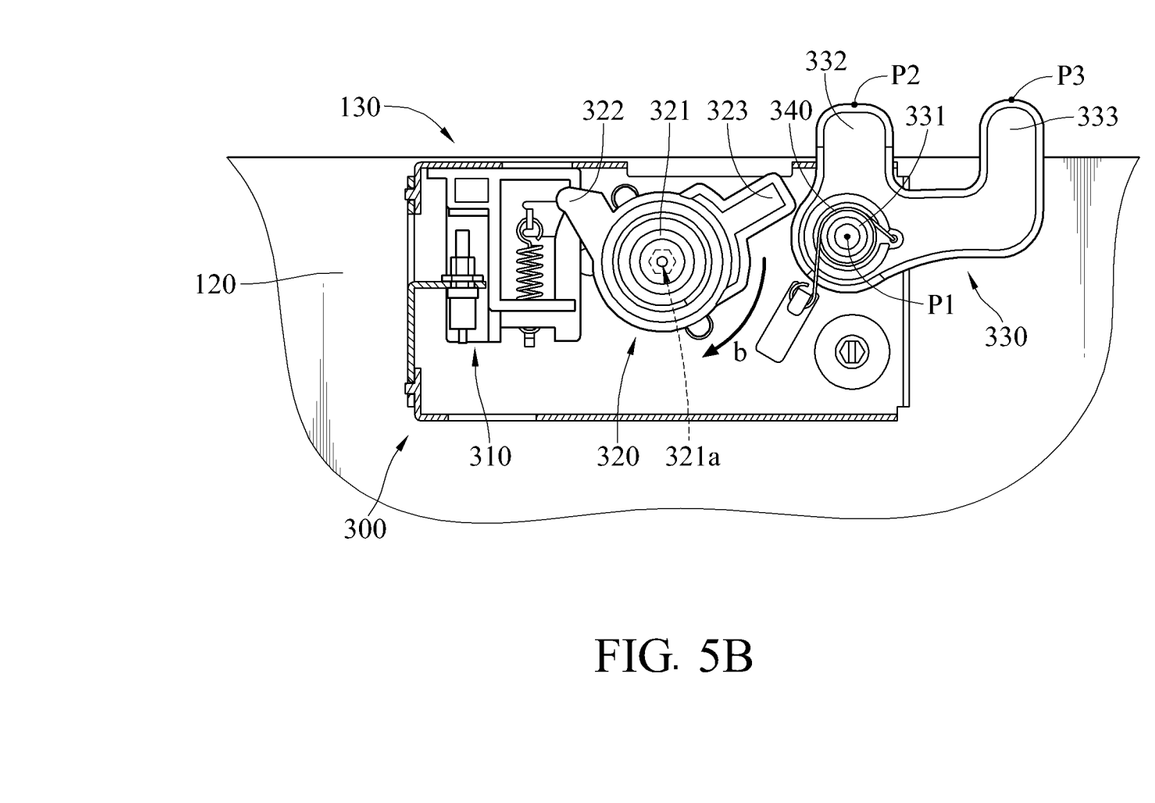
FIG. 5B is a plan view of FIG. 5A.
Figure 6:
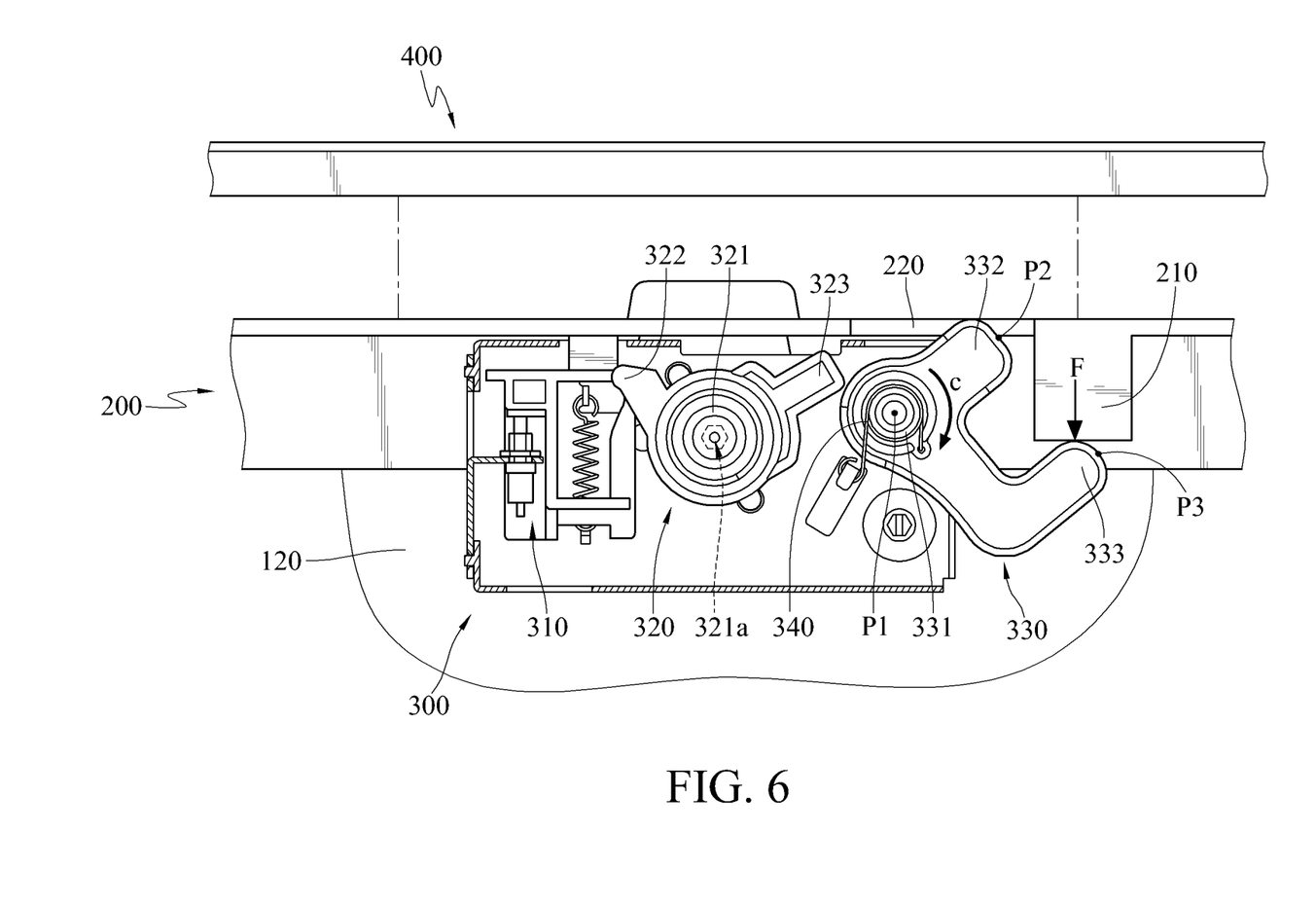
FIG. 6 is an assembling drawing of the cover FIG. 1.
Figure 7:
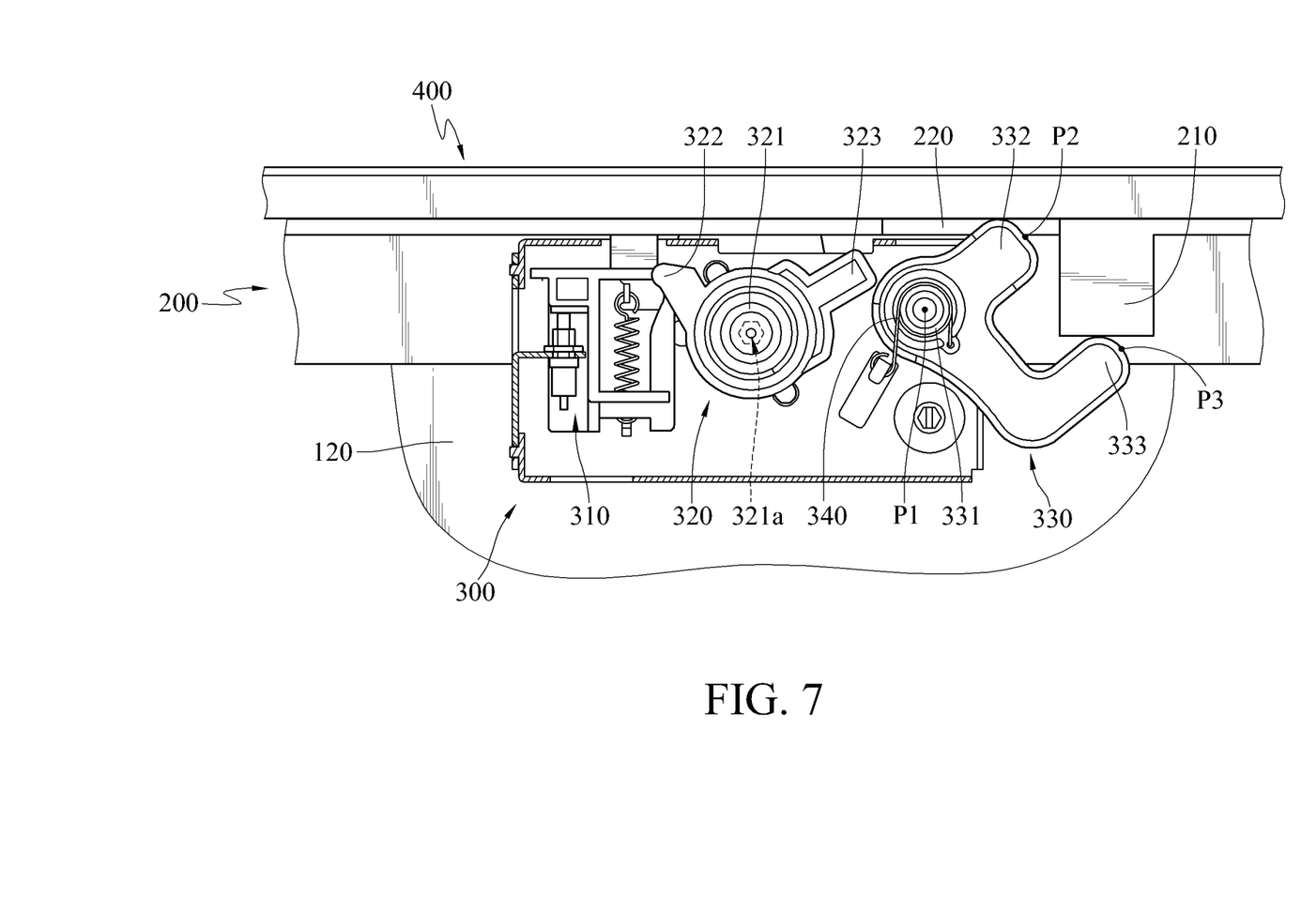
FIG. 7 is an assembling drawing of the lid FIG. 1.

FIG. 4A is a perspective view of a switch-changing element located at the test position according to the first embodiment of the disclosure. FIG. 4B is a plan view of FIG. 4A. FIG. 5A is a perspective view of a switch-changing element located at the non-test position according to the first embodiment of the disclosure. FIG. 5B is a plan view of FIG. 5A. FIG. 6 is an assembling drawing of FIG. 1. FIG. 7 is an assembling drawing of FIG. 1

As shown in FIG. 4A and FIG. 4B, when the technicians test the services, the tool 40 is inserted into the adjusting structure 321a and is rotated along the direction designated by an arrow a, for rotating the switch-changing element 320. The pressing part 322 therefore presses the pressing switch 310 to make the pressing switch 310 be in the turn-on state. Therefore, the pressing switch 310 makes the power supply 30 conducted so that the technicians are able to test.

As shown in FIG. 5A and FIG. 5B, when the technicians finish the testing, the tool 40 is inserted into the adjusting structure 321a and is rotated along the opposite direction designated by an arrow b to rotate the switch-changing element 320. The pressing part 322 therefore moves out from the pressing switch 310 to make the pressing switch 310 return from the turn-on state to the turn-off state.

As shown in FIG. 6, the stop part 323 moves out from the space Si occupied by the cover 200 so that the cover 200 is successfully connected to the cover position when the switch-changing element 320 is located at the non-testing position. Meanwhile, the cover 200 produces a force Fl, which does not pass through the pivot point P1, to drive the fool-proof element 330 to the pressed position and the convex part 332 of the fool-proof element 330 is located in the groove 220.

As shown in FIG. 7, the convex part 332 moves out from a space S2 originally occupied by the lid 400 locating at the assembling position when the fool-proof element 330 is moved to the pressed position by the cover 200, which makes the lid 400 successfully connected to the covering position.

Figure 8:
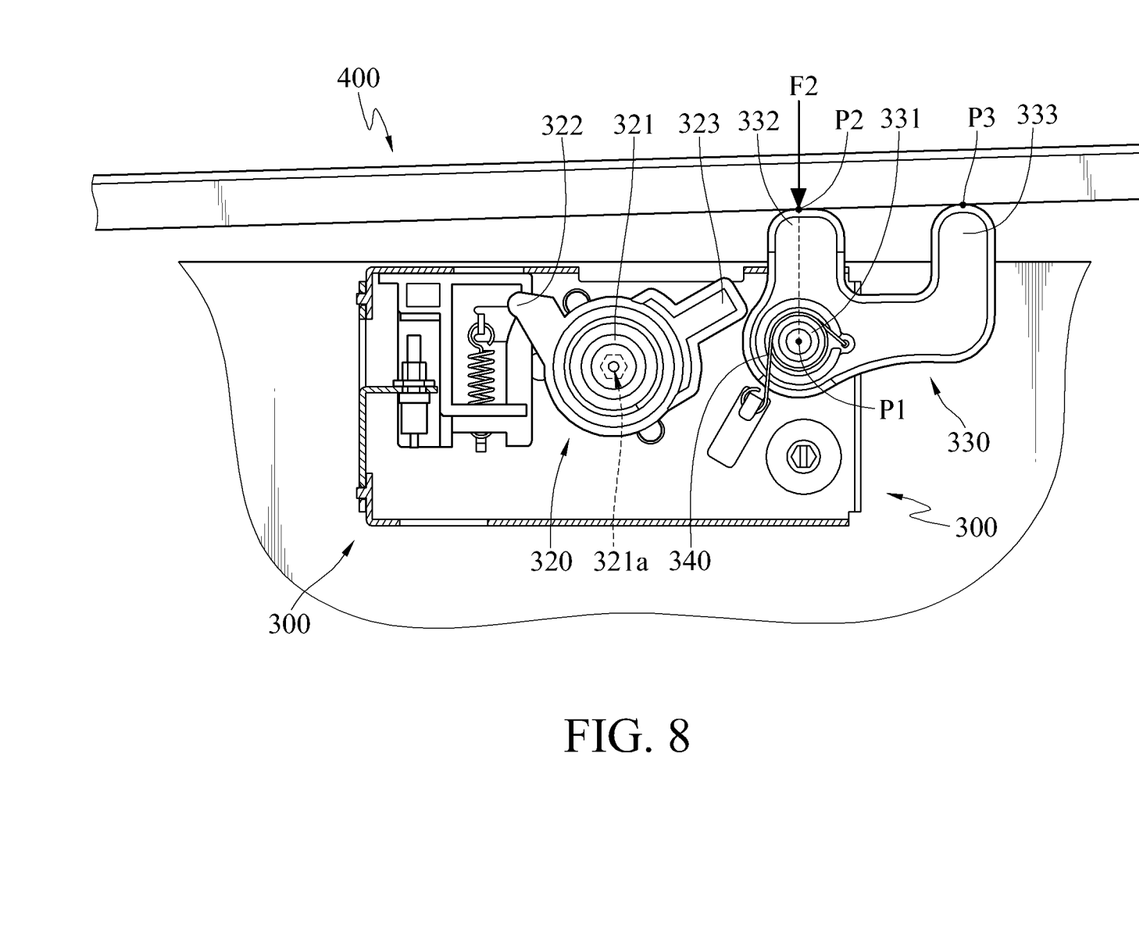
FIG. 8 is a plan view of a case in FIG. 1 with wrong assembling steps.

FIG. 8 is a plan view of a case in FIG. 1 with wrong assembling steps.

In the following example, a series of wrong assembling steps is used to explain the functions of the fool-proof element 330. When the cover 200 is assembled on the covering position before the lid 400 is assembled, the fool-proof element 330 is not moved by the cover 200 and therefore is still at the starting position. In order to avoid the lid 400 being wrongly connected to the assembling position, the convex part 332 of the fool-proof element 330 is located in the space S2 originally occupied by the lid 400 locating at the assembling position. Consequently, the cover 200 is ensured to be connected to the case 10 before the lid 400 is mounted, which prevents that the power supply 30 is not conducted because of missing the cover 200.

Figure 9:
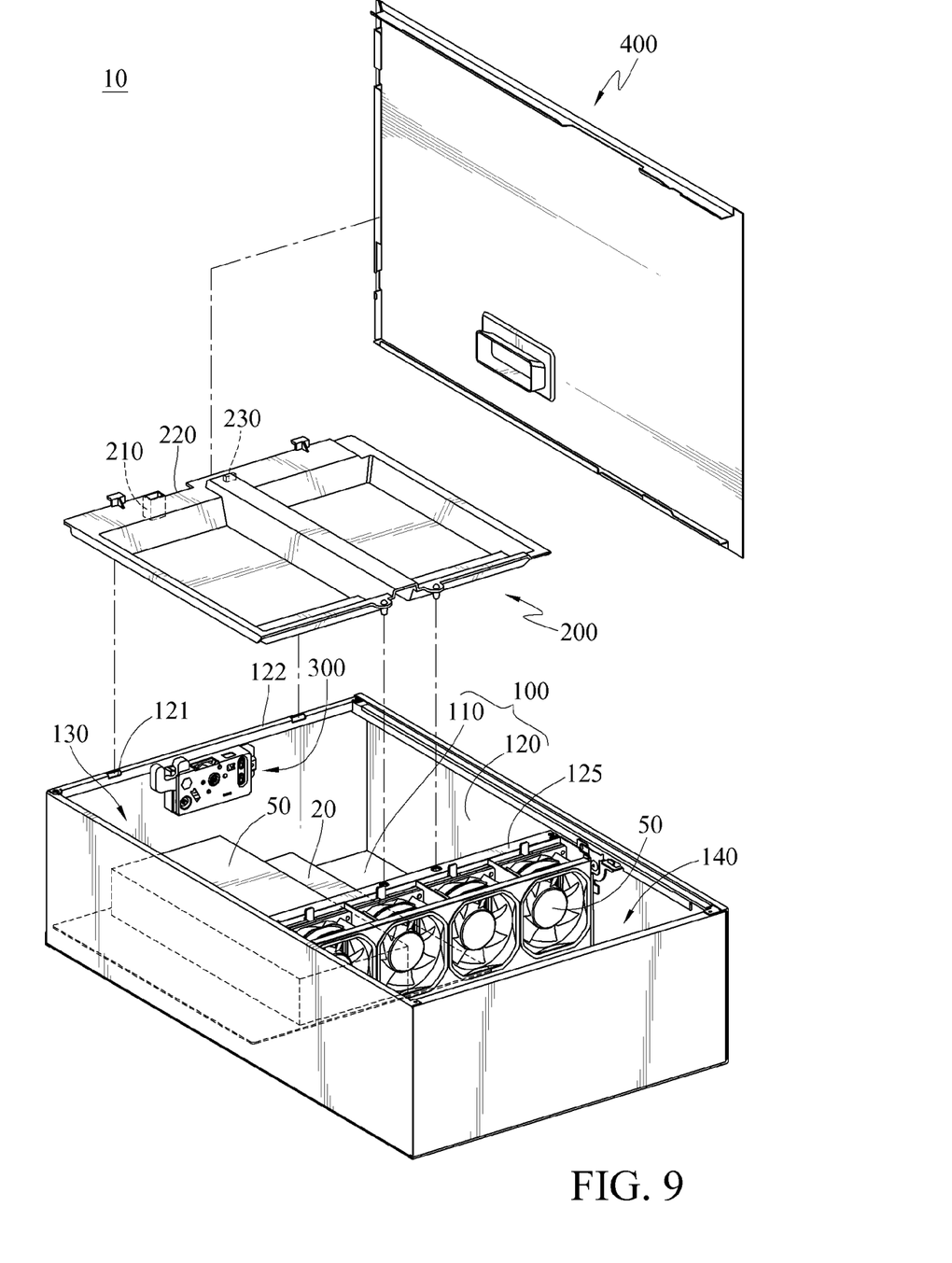
FIG. 9 is an exploded view of a case according to a second embodiment of the disclosure.

FIG. 9 is an exploded view of a case according to a second embodiment of the disclosure. As seen in FIG. 9, a housing 100 comprises a bottom plate 110, a plurality of side plates 120 and a separating plate 125. The side plates 120 are connected to the bottom plate 110 to form an accommodation portion 130 and a fans accommodating space 140. A switch module with a secure mechanism 300 is located in the accommodation portion 130. A cover 200 is assembled with the side plates 120 and the separating plate 125 to cover the switch module with the secure mechanism 300 in the accommodation portion 130.

In this embodiment, a case 10 further comprises a plurality of fans 50. The fans 50 are located in the fans accommodating space 140. When a lid 400 is located at the assembling position, the lid 400 is assembled with the side plates 120 so that the cover 300 and the fans 50 are sealed in the fans accommodating space 140. When the lid 400 is lifted, a power supply 30 is conducted and the damaged fans 50 are able to be replaced because the cover 200 presses a pressing switch 310.

The disclosure provides the case having the switch module with the secure mechanism. The stop part of the switch module is able to ensure the pressing switch is driven by pressing the cover instead of the switch-changing element when the cover is in the cover position. Therefore, the pressing switch automatically changes from the turn-on state to the turn-off state when the cover moves out from the cover position, and the power supply is not conducted to avoid the electric shock.

What is claimed is:

1. A case, comprising:
   a housing having an accommodation portion; and
   a cover which is detachably connected to the housing to have a cover position, wherein the cover covers the accommodation portion when the cover is in the cover position; and
   a switch module connected to the housing and located in the accommodation portion, comprising:
   a pressing switch for being pressed to have a turn-on state; and
   a switch-changing element comprising a first pivot part, a pressing part and a stop part, wherein the first pivot part is pivoted on the housing, the pressing part and the stop part jut out from the first pivot part along different radial directions, the switch-changing element is configured to rotate relative to the housing to have a test position and a non-test position; when the switch-changing element is in the test position, the pressing part presses the pressing switch so that the pressing switch is in the turn-on state and a position of the stop part overlaps the cover position to prevent the cover from being disposed on the housing; when the switch-changing element is in the non-test position, the pressing part is out from the switch-changing element and the position of the stop part does not overlap with the cover position to make the cover be capable of being disposed on the housing.

2. The case according to claim 1, wherein the cover presses the pressing switch to make the pressing switch be in the turn-on state.

3. The case according to claim 1, wherein the first pivot part has an adjusting structure configured for letting a tool to adjust the rotating location of the switch-changing element.

4. The case according to claim 1, wherein the case comprises a bottom plate and a plurality of side plates, the side plates are connected to the bottom plate to define the accommodation portion, each of the side plates has a first assembly region respectively, the cover contacts the first assembly region when being in the cover position, the position of the stop part overlaps the cover position to prevent the cover from being disposed on the cover position when the switch-changing element is in the test position, the stop part moves out from the cover position to make the cover in the cover position when the switch-changing element is in the non-test position.

5. The case according to claim 1, wherein the cover is a wind shield, the accommodation portion is sealed by the cover and the housing.

6. The case according to claim 1, further comprising a lid, wherein the housing comprises a bottom plate, a separating plate and a plurality of side plates, the side plates are connected to the bottom plate, opposite two sides of the separating plate are connected to two of the side plates to define a fans accommodating space and the accommodation portion, the switch module is located in the accommodation portion, the cover is assembled with the side plates and the separating plate to cover the accommodation portion, the lid is assembled with the side plates to cover the cover and the fans accommodating space.

7. The case according to claim 1, further comprising a lid, wherein the lid is detachably disposed on an assembling position of the housing, the cover has a holding part, the switch module further comprises a fool-proof element which comprises a second pivot part, a convex part and a blocking part, the convex part and the blocking part jut out from the second pivot part, the fool-proof element rotates relative to the housing around a pivot point as a centerline and therefore has a starting position and a pressed position, the convex part overlaps the assembling position to prevent the lid from being disposed on the housing when the fool-proof element is located at the starting position, the holding part of the cover presses the blocking part to drive the fool-proof element to pivot from the starting position to the pressed position when the cover is connected to the housing, which makes the fool-proof element does not overlap the assembling position and the lid is capable of being connected to the housing.

8. The case according to claim 7, wherein the second pivot part has a pivot point, the convex part has a stop point, the blocking part has a blocking point, the cover and the lid are connected to the housing along an assembling direction; a line from the pivot point to a first touching point is parallel to the assembling direction when the fool-proof element is located at the starting position, and a line from the pivot point to a second touching point encloses an acute angle with the assembling direction.

9. The case according to claim 7, wherein the switch module further comprises an elastic element which abuts on the housing and the fool-proof element to make the fool-proof element be located at the starting position.

10. The case according to claim 7, wherein the side plates have a second assembly region respectively, the lid contacts the second assembly region when locating at the assembling position, the fool-proof element juts out from the second assembly region when locating at the starting position, and the fool-proof element does not jut out from the second assembly region when locating at the pressed position.

11. A switch module with a secure mechanism configured to be connected to a housing and located in an accommodation portion, wherein a cover and a lid are assembled with the housing, the cover covers the accommodation portion to have a cover position, the lid covers the cover, the switch module with the secure mechanism comprising:

a pressing switch for being pressed to have a turn-on state; and a switch-changing element including a first pivot part, a pressing part and a stop part, wherein the first pivot part is pivoted on the housing, the pressing part and the stop part jut out from the first pivot part along different radial directions, the switch-changing element is configured to rotate relative to the housing to have a test position and a non-test position; when the switch-changing element is in the test position, the pressing part presses the pressing switch to make the pressing switch be in the turn-on state and a position of the stop part overlaps the cover position to prevent the cover from being disposed on the housing, when the switch-changing element is in the non-test position, the pressing part moves out from the switch-changing element and the position of the stop part does not overlap the cover position to make the cover be capable of being disposed on the housing.

12. The switch module with the secure mechanism according to claim 11, wherein the cover presses the pressing switch to make the pressing switch be in the turn-on state.

13. The switch module with the secure mechanism according to claim 11, wherein the first pivot part has an adjusting structure, the adjusting structure is configured for letting a tool to adjust a rotating location of the switch-changing element.

14. The switch module with the secure mechanism according to claim 11, further comprising a fool-proof element which comprises a second pivot part, a convex part and a blocking part, wherein the cover has a holding part, the convex part and the blocking part both jut out from the second pivot part, the second pivot part has a pivot point, the convex part has a first touching point contacting the lid, the blocking part has a second touching point contacting the holding part, the fool-proof element rotates relative to the housing around a pivot point as a centerline and has a starting position and a pressed position, a position of the convex part overlaps an assembling position to prevent the lid from being disposed on the housing when the fool-proof element is located at the starting position, the holding part of the cover presses the blocking part to activate the fool-proof element to pivot from starting position to pressed position when the cover is connected to the housing, which makes a position of the fool-proof element does not overlap the assembling position and the lid is capable of being disposed on the housing.

15. The switch module with the secure mechanism according to claim 14, wherein the second pivot part has a pivot point, the convex part has a stop point, the blocking part has a blocking point, the cover and the lid are disposed on the housing along the assembling direction; a line from the pivot point to a first touching point is parallel to the assembling direction when the fool-proof element is located at the starting position, a line from the pivot point to a second touching point encloses an acute angle with the assembling direction.

16. The switch module with the secure mechanism according to claim 15, further comprising an elastic element which abuts on the housing and the fool-proof element to make the fool-proof element be located at the starting position.

* * * * *